(12) United States Patent
Wu et al.

(10) Patent No.: US 12,544,671 B2
(45) Date of Patent: Feb. 10, 2026

(54) METHOD AND APPARATUS FOR TRAINING RECOMMENDATION MODEL, COMPUTER DEVICE, AND STORAGE MEDIUM

(71) Applicant: TENCENT TECHNOLOGY (SHENZHEN) COMPANY LIMITED, Shenzhen (CN)

(72) Inventors: Chongzheng Wu, Shenzhen (CN); Biao Liu, Shenzhen (CN); Dezhi Liu, Shenzhen (CN); Quan Gan, Shenzhen (CN); Qiang Fei, Shenzhen (CN); Pan Shuai, Shenzhen (CN); Ningguo Chen, Shenzhen (CN); Jianwei Deng, Shenzhen (CN); Xue Ke, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 471 days.

(21) Appl. No.: 18/076,670

(22) Filed: Dec. 7, 2022

(65) Prior Publication Data

US 2023/0102337 A1 Mar. 30, 2023

Related U.S. Application Data

(63) Continuation of application No. PCT/CN2021/116707, filed on Sep. 6, 2021.

(30) Foreign Application Priority Data

Sep. 15, 2020 (CN) .......................... 202010968629.0

(51) Int. Cl.
*A63F 13/61* (2014.01)

(52) U.S. Cl.
CPC ...... *A63F 13/61* (2014.09); *A63F 2300/5506* (2013.01)

(58) Field of Classification Search
CPC .......... A63F 13/61; A63F 13/67; A63F 13/79; A63F 2300/5506; G06F 16/9535; G06N 3/045; G06N 3/084; G06Q 50/01
See application file for complete search history.

(56) References Cited

U.S. PATENT DOCUMENTS 10,685,308 B1 * 6/2020 Avery, Jr. ................ H04L 67/10
2019/0364123 A1 11/2019 Gao et al.

FOREIGN PATENT DOCUMENTS

| CN | 109389168 A | 2/2019 |
|---|---|---|
| CN | 109993627 A | 7/2019 |

(Continued)

OTHER PUBLICATIONS

The World Intellectual Property Organization (WIPO) International Search Report for PCT/CN2021/116707 Nov. 25, 2021 7 Pages (including translation).

(Continued)

*Primary Examiner* — Adam L Levine
(74) *Attorney, Agent, or Firm* — Anova Law Group, PLLC

(57) ABSTRACT

A recommendation model training method includes: acquiring first preference information corresponding to users for a first object, the first object being an object on which the users have performed a designated operation; determining second preference information corresponding to users for a second object, the second object being an object on which the users have not performed a designated operation; correcting the first and second preference information based on preference features of users for an object and correlation features between objects and the users, to obtain third preference information of the users for the objects; generating training (Continued)

data based on the third preference information, a user attribute of a target user, an object attribute of a target object, and operation information of the target user for the target object; and performing iterative training on a target recommendation model based on the training data until a training condition is satisfied.

16 Claims, 8 Drawing Sheets

(56) References Cited

FOREIGN PATENT DOCUMENTS

| CN | 110874787 | A |   | 3/2020  |         |
|----|-----------|---|---|---------|---------|
| CN | 112069414 | A |   | 12/2020 |         |
| CN | 112579883 | A | * | 3/2021  | G06F 16/9535 |
| CN | 112989174 | A | * | 6/2021  |         |
| CN | 116501952 | A | * | 7/2023  |         |
| CN | 112632403 | B | * | 4/2024  | G06F 16/9536 |
| KR | 20200065426 | A | * | 6/2020 |         |

OTHER PUBLICATIONS

Xueming Qian et al. "Personalized recommendation combining user interest and social circle". 2013, p. 1763-1777. vol. 26 No. 7. IEEE transactions on knowledge and data engineering.

Mayur Datar et al. "Locality-Sensitive Hashing Scheme Based on p-Stable Distributions". 2004, p. 253-262. Proceedings of the twentieth annual symposium on Computational geometry.

Tara N. Sainath et al. "Convolutional, Long Short-Term Memory, Fully Connected Deep Neural Networks", 2015, p. 4580-4584, 2015 IEEE International Conference on Acoustics, Speech and Signal Processing (ICASSP).

Lars Kai Hansen et al. "Neural Network Ensembles", 1990, p. 993-1001, vol. 12 No. 10. IEEE transactions on pattern analysis and machine intelligence.

William S Noble. "What is a support vector machine?", 2006, p. 1565-1567, vol. 24 No. 12, Computational Biology.

S.Rasoul Safavian et al. "A Survey of Decision Tree Classifier Methodology", 1991. vol. 21 No.3.

* cited by examiner

METHOD AND APPARATUS FOR TRAINING RECOMMENDATION MODEL, COMPUTER DEVICE, AND STORAGE MEDIUM

CROSS-REFERENCES TO RELATED APPLICATIONS

This application is a continuation application of PCT Patent Application No. PCT/CN2021/116707, entitled "METHOD AND APPARATUS FOR TRAINING RECOMMENDATION MODEL, AND COMPUTER DEVICE AND STORAGE MEDIUM" and filed on Sep. 6, 2021, which claims priority to Chinese Patent Application No. 202010968629.0, entitled "METHOD AND APPARATUS FOR TRAINING RECOMMENDATION MODEL, COMPUTER DEVICE, AND STORAGE MEDIUM" and filed on Sep. 15, 2020, the entire contents of both of which are incorporated herein by reference.

FIELD OF THE TECHNOLOGY

The present disclosure relates to the field of computer technologies, and in particular, to a method and an apparatus for training a recommendation model, a computer device, and a storage medium.

BACKGROUND OF THE DISCLOSURE

With the development of Internet technology, personalized item recommendation based on cloud computing and big data is widely used, for example, in the game field to recommend various virtual items to users. At present, an item recommendation model constructed based on big data is usually used in item recommendation. Since a huge amount of data needs to be processed for constructing training data, it takes a relatively long time to perform model training, making it difficult to satisfy the requirement of fast service launching. When the preference of users for items changes with time, the accuracy of model prediction results may be relatively low because parameters of a recommendation model are not updated in time according to current user data. There is a need to improve the efficiency of model training and the accuracy of model prediction.

SUMMARY

Embodiments of the present disclosure provide a method and an apparatus for training a recommendation model, a computer device, and a storage medium, which can reduce the complexity and time consumption in generating training data, thereby improving the efficiency of model training. The technical solutions are as follows:

In an aspect, a method for training a recommendation model is provided, the method including: acquiring first preference information corresponding to a plurality of users, the first preference information representing preference degrees of the users for a first object, the first object being an object on which the users have performed a designated operation; determining second preference information corresponding to the plurality of users, the second preference information representing preference degrees of the users for a second object, the second object being an object on which the users have not performed a designated operation; correcting the first preference information and the second preference information based on preference features of users for an object and correlation features between objects and the users, to obtain third preference information of the users for the objects, the preference features and the correlation features being determined based on preference degrees of the users for the objects; generating training data based on the third preference information, a user attribute of a target user to which the third preference information belongs, an object attribute of a target object to which the third preference information belongs, and operation information of the target user for the target object; and performing iterative training on a target recommendation model based on the training data, and obtaining a trained target recommendation model in response to that an output result of the target recommendation model satisfies a training condition.

In an aspect, an apparatus for training a recommendation model is provided, the apparatus including: a first acquisition module, configured to acquire first preference information corresponding to a plurality of users, the first preference information representing preference degrees of the users for a first object, the first object being an object on which the users have performed a designated operation; a determining module, configured to determine second preference information corresponding to the plurality of users, the second preference information representing preference degrees of the users for a second object, the second object being an object on which the users have not performed the designated operation; a second acquisition module, configured to correct the first preference information and the second preference information based on preference features of users for an object and correlation features between objects and the users, to obtain third preference information of the users for the objects, the preference features and the correlation features being determined based on preference degrees of the users for the objects; a generation module, configured to generate training data based on the third preference information, a user attribute of a target user to which the third preference information belongs, an object attribute of a target object to which the third preference information belongs, and operation information of the target user for the target object; and a training module, configured to: perform iterative training on a target recommendation model based on the training data, and obtain a trained target recommendation model in response to that an output result of the target recommendation model satisfies a training condition.

According to an aspect, a computer device is provided, the computer device including one or more processors and one or more memories, the one or more memories storing at least one piece of program code, the at least one piece of program code, when being loaded and executed by the one or more processors, implementing the operations performed in the method for training a recommendation model.

According to an aspect, a non-transitory computer-readable storage medium is provided, the computer-readable storage medium storing at least one piece of program code, the at least one piece of program code, when being loaded and executed by a processor, implementing the operations performed in the method for training a recommendation model.

According to an aspect, a computer program product or a computer program is provided, the computer program product or the computer program including at least one piece of program code, the at least one piece of program code being stored in a computer-readable storage medium. A processor of a computer device reads the at least one piece of program code from the computer-readable storage medium, and the processor, when executing the computer program code, causes the computer device to implement the operations performed in the method for training a recommendation model.

DESCRIPTION OF EMBODIMENTS

Figure 1:
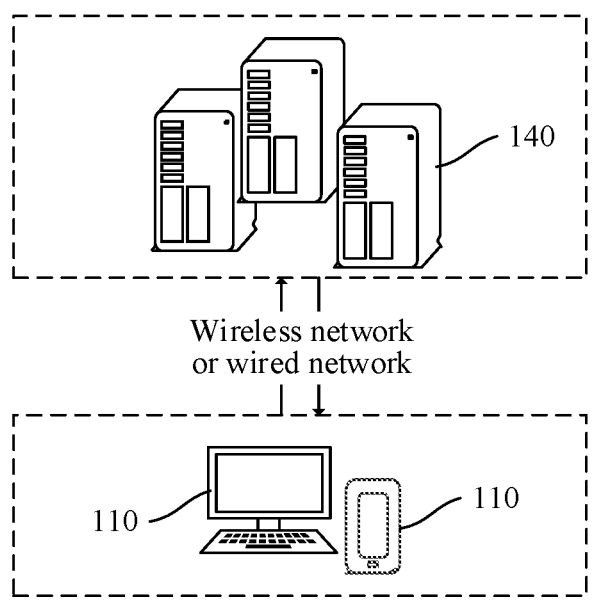
FIG. 1 is a schematic diagram of an implementation environment of a method for training a recommendation model according to an embodiment of the present disclosure.

To make the objectives, technical solutions, and advantages of the present disclosure clearer, the implementations of the present disclosure are further described below in detail with reference to the accompanying drawings. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

Terms such as "first" and "second" are used in the present disclosure to distinguish between same items or similar items that have basically same purposes and functions. The terms such as "first", "second", and "$n^{th}$" do not have a logical or temporal dependence and do not limit a quantity or an execution sequence.

Cloud technology is a hosting technology that unifies a series of resources such as hardware, software, and networks in a wide area network or local area network to implement computing, storage, processing, and sharing of data. Cloud technology is a general term for network technology, information technology, integration technology, management platform technology, application technology, and the like applied based on cloud computing business models to form a resource pool for flexible and convenient use on demand. Cloud technology will turn out to be an important support. For example, backend services of a technical network system require a lot of computing and storage resources. The technical network system includes video websites, picture websites, and more portals. Along with the high development and application of the internet industry, in the future, every item may have its own identification mark, which needs to be transmitted to a backend system for logical processing. Different levels of data are processed separately. All kinds of industry data require a strong system backing support, and cloud computing is required for implementation. Embodiments of the present disclosure involve big data processing in cloud technology, and require user profiling based on cloud data to determine preference features of users for various type of objects.

Big data is a collection of data that cannot be captured, managed, and processed within a certain time range with software tools, and is a massive, high-growth rate, and diverse information asset that requires new processing models to have greater decision-making power, insight discovery, and process optimization capabilities. With the advent of the cloud era, big data is also attracting increasing attention. Big data requires special technologies to efficiently process a large amount of data within a tolerable elapsed time. Technologies applicable to big data include massively parallel processing databases, data mining, distributed file systems, distributed databases, cloud computing platforms, the internet, and scalable storage systems.

An item recommendation model constructed based on a deep neural network can be used in item recommendation. In a model training stage, user attribute features, item attribute features, and contextual features of user items need to be extracted from a large amount of online data, and data modeling is performed to construct a training data set to train the item recommendation model, so as to obtain a trained item recommendation model.

In the foregoing model training process, a huge amount of data needs to be processed for constructing training data. Such a method for directly extracting features from online data to perform data modeling consumes a relatively long time, and as a result it takes a relatively long time to perform model training, making it difficult to satisfy the requirement of fast service launching. In addition, because it takes a relatively long time to perform model training once, an update period of model parameters is relatively long. When the preference of users for items changes with time, the accuracy of model prediction results may be relatively low because parameters of a recommendation model are not updated in time according to current user data. Therefore, in a model training stage, how to construct training data to improve the efficiency of model training and the accuracy of model prediction is an important research direction.

FIG. 1 is a schematic diagram of an implementation environment of a method for training a recommendation model according to an embodiment of the present disclosure. The implementation environment includes a terminal 110 and an object recommendation platform 140.

The terminal 110 is a smartphone, a tablet computer, a notebook computer, a desktop computer, a smart speaker, a smartwatch, or the like, but is not limited thereto. A target application supporting object recommendation is installed and run on the terminal 110. For example, the target application is a game application, a shopping application, or a video application. The type of the target application is not limited in the embodiments of the present disclosure. In the embodiments of the present disclosure, an example in which the target application is a game application is used for description. For example, the terminal 110 is a terminal used by a user. The user logs in to a user account in the target application run in the terminal 110. The terminal 110 may be generally one of a plurality of terminals. In this embodiment, only the terminal 110 is used as an example for description.

The object recommendation platform 140 is configured to provide a backend service to the target application supporting object recommendation. In some embodiments, the object recommendation platform 140 is responsible for primary object recommendation work, and the terminal 110 is responsible for secondary object recommendation work. Alternatively, the object recommendation platform 140 is responsible for secondary object recommendation work, and the terminal 110 is responsible for primary object recommendation work. Alternatively, the object recommendation platform 140 or the terminal 110 is separately responsible for object recommendation work. In some embodiments, the object recommendation platform 140 includes an access server, an object recommendation server, and a database. The access server is configured to provide an access service to the terminal 110. The object recommendation server is configured to provide a backend service related to object recommendation. One or more object recommendation servers are provided. When there are a plurality of object recommendation servers, at least two object recommendation servers are configured to provide different services, and/or, at least two object recommendation servers are configured to provide the same service, for example, provide the same type of service in a load balanced manner. This is not limited in the embodiments of the present disclosure. A target recommendation model is disposed in the object recommendation server. The object recommendation server provides support for a process of training and applying a model. The server is an independent physical server, or is a server cluster or a distributed system formed by a plurality of physical servers, or is a cloud server providing basic cloud computing services, such as a cloud service, a cloud database, cloud computing, a cloud function, cloud storage, a network service, cloud communication, a middleware service, a domain name service, a security service, a content delivery network (CDN), and a big data and artificial intelligence (AI) platform.

The terminal 110 and the object recommendation platform 140 may be directly or indirectly connected in a wired or wireless communication manner. This is not limited in the embodiments of the present disclosure.

A person skilled in the art can know that there are more or fewer terminals 110. For example, there is only one terminal 110, or there are dozens of or hundreds of terminals 110 or more. The quantity and the device type of the terminals 110 are not limited in the embodiments of the present disclosure.

Embodiments of the present disclosure provide a method for training a recommendation model. The solution is applied to a plurality of scenarios, and is combined with applications of a plurality of types. For example, the solution is combined with a game application, and in a virtual item recommendation scenario of a game, a target recommendation model is used to recommend a virtual item to a user. The solution is combined with a shopping application, and a target recommendation model is used to recommend various commodities to a user. The technical solution provided in the embodiments of the present disclosure can be combined with other scenarios such as video recommendation and music recommendation. This is not limited in the embodiments of the present disclosure. In the plurality of scenarios, the technical solution provided in the embodiments of the present disclosure is used to reduce the time consumed in a training data generation stage to reduce the time consumed to perform model training once, thereby improving the training efficiency of a model, so that the model can be updated in time according to latest online data, and it is ensured that prediction results of the model satisfy current preference of users.

Figure 2:
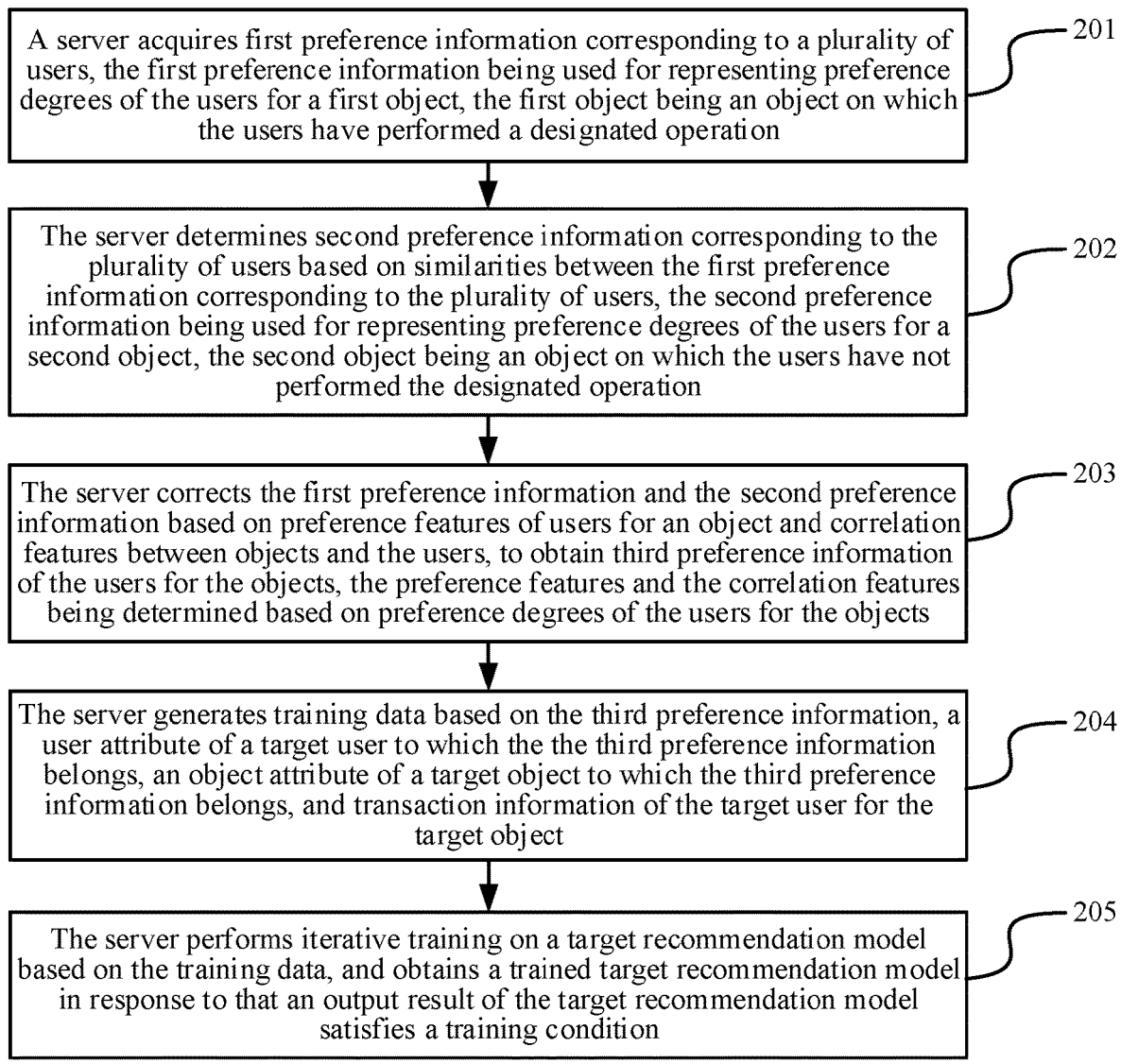
FIG. 2 is a flowchart of a method for training a recommendation model according to an embodiment of the present disclosure.

FIG. 2 is a flowchart of a method for training a recommendation model according to an embodiment of the present disclosure. The method is applied to the foregoing application environment. The embodiments of the present disclosure are performed by a computer device. An example in which the computer device is a server is used for description below, to describe the method for training a recommendation model. Referring to FIG. 2, this embodiment specifically includes the following steps:

201: A server acquires first preference information corresponding to a plurality of users, the first preference information representing preference degrees of the users for a first object, the first object being an object on which the users have performed a designated operation.

The first object is an object purchased by a user. For example, in a game application, the object is a virtual item, a virtual character, the appearance of a virtual character set in a game, that is, an interactive item, a hero, a skin, or the like. In a shopping application, the object is a commodity sold on a shopping platform. A specific form of the object is not limited in the embodiments of the present disclosure. The object may also be understood as an item. In some embodiments, the designated operation on the object may be a transaction on the object, a selection operation on the object such as marking as favorites, adding to a specific item list, etc.

In one embodiment, the first preference information is correlated with usage of the first object by the users. For example, the first preference information is correlated with information such as use frequency of the first object by the users and an interval between a current moment and a moment at which the first object is used a previous time. The first preference information is represented in the form of a preference value. The value of the first preference information is positively correlated with the preference degrees of the users for the first object.

202: The server determines second preference information corresponding to the plurality of users based on similarities between the first preference information corresponding to the plurality of users, the second preference information representing preference degrees of the users for a second object, the second object being an object on which the users have not performed the designated operation.

The second object is an object that is not purchased by a user.

In one embodiment, the server determines similar users based on the similarities between the first preference information corresponding to the users, that is, determines users with similar preference for an object as similar users. For any user, the second preference information of the any user for the second object is predicted based on the first preference information corresponding to users similar to the any user. That is, preference information of the users for an unpurchased object is predicted based on preference information of the users for a purchased object.

In another embodiment, the server transmits a request for acquiring the second preference information from another device, and the another device determines the second preference information corresponding to the plurality of users based on the similarities between the first preference information corresponding to the plurality of users. The another device transmits the second preference information corresponding to the plurality of users to the server.

In another embodiment, the second preference information is represented in the form a preference value. The server sets the second preference information corresponding to the plurality of users to a reference value. The reference value is not limited in the embodiments of the present disclosure. For example, the reference value is 0.

The second preference information corresponding to the plurality of users can be determined in all the foregoing three manners.

203: The server corrects the first preference information and the second preference information based on preference features of users for an object and correlation features between objects and the users, to obtain third preference information of the users for the objects, the preference features and the correlation features being determined based on preference degrees of the users for the objects.

In one embodiment, the server extracts preference features in a user dimensionality and correlation features in an object dimensionality from the first preference information and the second preference information corresponding to the users. The preference features are used for indicating preference of the users for objects of various types, and the correlation features are used for indicating preference of users of various types for the objects. The server globally corrects the first preference information and the second preference information based on the features in the two dimensionalities to obtain third preference information of the users for the objects.

204: The server generates training data based on the third preference information, a user attribute of a target user to which the third preference information belongs, an object attribute of a target object to which the third preference information belongs, and operation information of the target user for the target object. In some embodiments, the operation information may include transaction information, The user attribute is the gender, age, preference information, and the like of a user. The object attribute is a category, a use scenario, and the like of an object. This is not limited in the embodiments of the present disclosure. For example, in a game scenario, the user attribute is the gender, age, a level in a game, a used virtual character type, and the like of a user. When the object is a virtual item, the object attribute is an attack type, a user scenario, and the like of the virtual item. In another example, in a shopping scenario, the user attribute is the gender, age, region of origin, and the like of a user. When the object is a commodity, the object attribute is a category of the commodity, a region of origin of the commodity, a review grade of the commodity, and the like.

The generation of training data is used as an example. In one embodiment, the server respectively acquires, based on a target user and a target object to which any third preference information belongs, a user attribute of the target user, an object attribute of the target object, and operation information of the target user for the target object, quantifies the information, and combine the any third preference information and the quantified information to obtain training data. Certainly, the server may acquire the training data in another manner. This is not limited in the embodiments of the present disclosure.

S205: The server performs iterative training on a target recommendation model based on the training data, and obtains a trained target recommendation model in response to that an output result of the target recommendation model satisfies a training condition.

The target recommendation model is a dichotomy model constructed based on a deep neural network. The target recommendation model can output, based on sample data, a category to which the sample data belongs and a probability of the category. For example, the sample data is information such as a user attribute and an object attribute. The category includes a preference category or a no-preference category.

In one embodiment, the server inputs a plurality of pieces of acquired training data into the target recommendation model, and determines an error value between an output result of the target recommendation model and the third preference information in the training data. In response to that the error value does not satisfy a training condition, the error value is backpropagated to the target recommendation model to solve parameters of operation layers in the target recommendation model, and then training data is inputted into the target recommendation model with adjusted parameters. In response to that the error value satisfies a training condition, model training is stopped, to obtain a trained target recommendation model. The training condition is set by a developer. This is not limited in the embodiments of the present disclosure.

In the technical solution provided in the embodiments of the present disclosure, second preference information of users for an unpurchased object is preliminarily predicted based on first preference information of the users for a purchased object, features in a user dimensionality and features in an object dimensionality are respectively extracted from the obtained first preference information and second preference information, then currently acquired preference information is corrected based on the features in the two dimensionalities to obtain more accurate third preference information, and training data is generated according to the third preference information, so that it is not necessary to directly perform data modeling according to original online data, the complexity and time consumption in a process of generating training data can be reduced, and a training period of a model is further reduced. In addition, the model can be updated in time according to latest user data, and an output result of the model can better meet current user preference. That is, during the use of the model, the complexity of generating training data based on latest user data is reduced, so that the time consumed to update the model is reduced, and an output result of the model can better meet current user preference.

Figure 3:
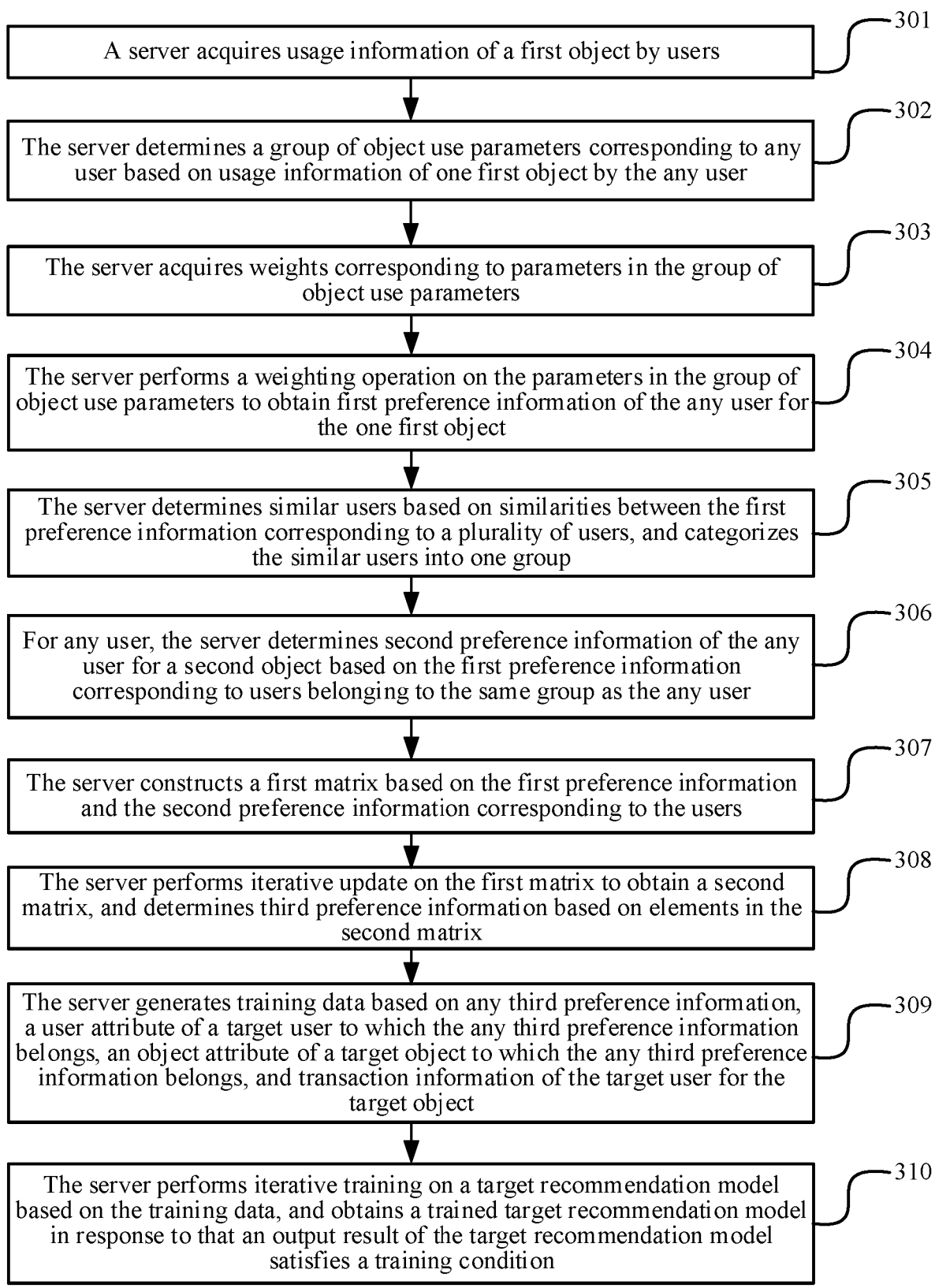
FIG. 3 is a flowchart of a method for training a recommendation model according to an embodiment of the present disclosure.

The foregoing embodiment is a brief description of the implementation of the present disclosure. FIG. 3 is a flowchart of a method for training a recommendation model according to an embodiment of the present disclosure. Referring to FIG. 3, a process of training the foregoing recommendation model is described in detail.

301: A server acquires usage information of a first object by users.

In one embodiment, the server acquires the usage information in response to a training instruction of the target recommendation model. The training instruction is triggered by a developer, or is automatically triggered based on a training period of a model. For example, the training period of the model is set to one week. A specific manner of triggering the training instruction is not limited in the embodiments of the present disclosure.

In one embodiment, the usage information is acquired from online user log flow data. This is not specifically limited in the embodiments of the present disclosure. In the embodiments of the present disclosure, the usage information of the one first object by the any user includes a first moment (FIRST_DATE) at which the any user uses the one first object for the first time, a second moment (LAST_DATE) at which the any user uses the one first object for the last time, a total quantity of times (TOTAL- _CNT) that the any user has used the one first object, and quantities of times that the any user has used the one first object within at least two reference time periods. The reference time period is set by a developer. For example, the reference time period is set to a period of one day before the current moment, a period of three days before the current moment, or the like. This is not limited in the embodiments of the present disclosure. In the embodiments of the present disclosure, a quantity of times of using a first object by a user within a reference time period is represented by PV_N. N is a positive integer, and represents N time units. The time unit is set by a developer. For example, when the time unit is set to one day, PV_1 represents a quantity of times of using a first object by a user within one day before the current moment, and the reference time period is a period of one day before the current moment. PV_3 represents a quantity of times of using a first object by a user within three days before the current moment, and the reference time period is a period of three days before the current moment. In this embodiment of the present disclosure, values PV_1, PV_3, PV_5, PV_7, PV_10, PV_15, PV_20, and PV_30 are taken.

In this embodiment of the present disclosure, the acquired usage information of the first object by the users include object usage by the users within different time periods. In consideration of the problem that the preference of users for an object change as time changes, temporal information is introduced in a process of generating training data, so that during training of the target recommendation model based on the training data, the model learns changes in the preference of the users for the object, thereby making a model preference result better meet current user preference. For example, in a game application, as the level of a user in a game increases, virtual items to be used change. The usage of virtual items by the user within different time periods is acquired from online log flow data. Subsequent model training is performed based on the information, to allow the model to learn the preference of the user for virtual items in different stages, so that current virtual items of interest can be accurately recommended to the user.

302: The server determines a group of object use parameters corresponding to any user based on usage information of one first object by the any user.

In the embodiments of the present disclosure, the server determines use parameters in a plurality of dimensionalities based on usage information of the first object by a user, that is, a group of object use parameters corresponding to the user. In one embodiment, the server determines use parameters in the following four dimensionalities:

1) The server determines a time interval parameter (TODAY-LAST_DATE) based on the second moment and a current moment. The time interval parameter is an interval between the current moment and a moment at which the any user uses the one first object for the last time. The parameter in this dimensionality represents a recent preference degree of the user for a first object. The value of the time interval parameter is negatively correlated with the recent preference degree of the user for a first object. In the embodiments of the present disclosure, the time interval parameter is represented by R. R is greater than 0.

2) The server determines a use frequency parameter based on the first moment, the current moment, and the total quantity of times, that is, a use frequency of a purchased object within a period after the any user purchases the object, that is, a use frequency of the first object. The parameter in this dimensionality represents a preference degree of the user for the first object within a purchase period of the first object. The value of the use frequency parameter is positively correlated with the preference degree of the user for the first object. In the embodiments of the present disclosure, the use frequency parameter is represented by F. F is greater than 0. A specific value of F is $$\frac{TOTAL\_CNT}{TODAY - FIRST\_DATE}.$$

For example, the use frequency parameter may be determined in the following manner: determining, by the server, the use frequency parameter based on the first moment, the second moment, and the total quantity of times. For example, the use frequency parameter is represented by F. F is greater than 0. A specific value of F is $$\frac{TOTAL\_CNT}{LAST\_DATE - FIRST\_DATE}.$$

3) The server determines the preference parameter based on the first moment, the second moment, the current moment, and the total quantity of times. The preference parameter is used for indicating the preference degree of the any user for the one first object at the current moment. In the embodiments of the present disclosure, the preference parameter is represented by RF. RF is greater than 0. A specific value of RF is $$\frac{(TODAY - LAST\_DATE) * TOTAL\_CNT}{TODAY - FIRST\_DATE}.$$

If an interval TODAY-LAST_DATE between the current moment and a moment at which the user uses a first object last time is represented by m. An interval between the moment at which the user uses the first object last time and a moment at which the user uses the first object for the first time, that is, an interval LAST_DATE-FIRST_DATE between the first moment and the second moment is represented by n. In this way, TODAY-FIRST_DATE is represented by m+n. An expression of the preference parameter is represented by $$\frac{m * TOTAL\_CNT}{m + n}.$$

A numerator and a denominator in the expression of the preference parameter is simultaneously divided by m. The preference parameter is represented by $$\frac{1 * TOTAL\_CNT}{1 + n/m}.$$

It can be seen that when TOTAL_CNT is constant, the value of the preference parameter depends on the value of n/m. The value of n/m is negatively correlated with the value of the preference parameter. When the preference parameter is smaller, it indicates that the user uses a first object for a longer time, the interval between the current moment and the moment at which the user uses the first object is shorter, and the preference degree for the first object is higher.

4) The server determines a balancing factor based on the quantities of times that the any user has used the one first object within the at least two reference time periods. In the embodiments of the present disclosure, the balancing factor is represented by the following Formula (1):

$$P = a*PV\_1 + b*\frac{PV\_3}{3} + c*\frac{PV\_5}{5} + d*\frac{PV\_7}{7} + e*\frac{PV\_10}{10} + f*\frac{PV\_15}{15} + g*\frac{PV\_20}{20} + h*\frac{PV\_30}{30},$$  (1)

where P represents a balancing factor, and PV_N represents a quantity of times of using a first object by a user within N time units before the current moment. In the embodiments of the present disclosure, the values of N are respectively 1, 3, 5, 7, 10, 15, 20, and 30. One time unit is one day. a, b, c, d, e, f, g, and h represent weight values, and are used for balancing the impact of quantities of use times within different time periods on the value of P. Specific values of the weight values are set by a developer. A sum of a, b, c, d, e, f, g, and h is equal to 1. In the embodiments of the present disclosure, the balancing factor is used for balancing preference degrees of the any user for the one first object within at least two reference time periods. Different weight values are set for quantities of use times within different reference time periods. For example, a smaller weight is set for a quantity of use times within a reference time period with a relatively large time span, thereby reducing cases that a preference degree for an object is relatively high because a quantity of times using the object by a user within a historical time period. For example, in a game scenario, an example in which the object is a virtual item is used. A marketing campaign for a virtual item is set within a historical time period. As a result, a quantity of times of using the virtual item within a duration of the marketing campaign increases dramatically. After the marketing campaign is over, the quantity of times of using the virtual item decreases greatly. In the embodiments of the present disclosure, a temporal factor is introduced in a process of determining the balancing factor, so that the impact caused by a historical marketing campaign on a quantity of times of using an object can be eliminated, and the accuracy of subsequently determined preference information of a user for an object can be improved, to make the determined preference information better reflect a recent preference degree of the user for the object.

The foregoing description of a multi-dimensionality object use parameter is only an exemplarily description. In the embodiments of the present disclosure, an object use parameter in another dimensionality is acquired based on usage information of objects by a user. This is not limited in the embodiments of the present disclosure. In the embodiments of the present disclosure, temporal information is introduced in the foregoing object use parameters in four dimensionalities, so that the problem of an interest drift of a user for objects can be effectively resolved.

303: The server acquires weights corresponding to parameters in the group of object use parameters.

In the embodiments of the present disclosure, to balance between determined impact degrees of the parameters on subsequent preference information, different weights need to be set for the parameters (R, F, RF, and P). In one embodiment, the server determines weights corresponding to the parameters by using an analytic hierarchy process. For example, the server respectively acquires a priori scores corresponding to the parameters, and determines the weights corresponding to the parameters based on the a priori scores and usage information of first objects by the users. The a priori score corresponding to each parameter is set by a person skilled in the art, and a plurality of groups of a priori scores may be set. That is, each parameter corresponds to a plurality of a priori scores. The server determines the weights corresponding to the parameters according to an analytic hierarchy process based on the a priori scores corresponding to the parameters and the usage information of the first object by a user.

The foregoing description of the methods for acquiring the weights of the parameters is only an exemplary description. Specific methods to be used to acquire the weights are not limited in the embodiments of the present disclosure. In the embodiments of the present disclosure, a priori scores, that is, scores given by experts, are used as a reference to determine the weights of the parameters, so that the impact of the parameters on the subsequently determined first preference information can be effectively balanced.

304: The server performs a weighting operation on the parameters in the group of object use parameters to obtain first preference information of the any user for the one first object.

In one embodiment, an attenuation factor is further introduced in a process of determining the first preference information based on a group of object use parameters. The attenuation factor is used for reducing the impact of historical data that has a relatively long interval from the current moment on the first preference information. For example, the attenuation factor is determined based on the time interval parameter R. Different value ranges of the time interval parameter R correspond to different attenuation factors. For example, when the time interval parameter R is relatively large, that is, when an interval from a moment at which a user uses an object last time is relatively long, an attenuation factor is set to reduce the impact of R on the first preference information. The foregoing description of a method for setting an attenuation factor is only an exemplary description of one embodiment. A specific method to be used to set an attenuation factor is not limited in the embodiments of the present disclosure.

In one embodiment, the server performs a weighting operation on the parameters based on the attenuation factor and the weights corresponding to the parameters to obtain the first preference information. Specifically, for example, after acquiring a group of object use parameters of one first object by any user, the server constructs a septuple vector (USER, ITEM, TOTAL_CNT, R, F, RF, and P). USER represents a user identifier (the user identifier is also referred to as a user sequence number) of the any user. ITEM represents an object sequence number of one first object. TOTAL_CNT represents a total quantity of times of using one first object by the any user. The server converts the septuple vector into a triple vector (USER, ITEM, ALL_SCORE) based on the weights corresponding to the parameters and the attenuation factor. ALL_SCORE represents the first preference information. In another example, for example, after acquiring a group of object use parameters of one first object by any user, the server constructs a sextuple vector (USER, ITEM, R, F, RF, and P). USER represents a user identifier of the any user. ITEM represents an object sequence number of one first object. The server converts the sextuple vector into a triple vector (USER, ITEM, ALL_SCORE). ALL_SCORE represents the first preference information. A manner of calculating ALL_SCORE is: multiplying R by an attenuation factor to obtain a product, and performing a weighting operation on the product, F, RF, and P to obtain ALL_SCORE.

In the embodiments of the present disclosure, the first preference information is represented in the form of a preference value. The value of the first preference information is positively correlated with recent preference degrees of the users for the objects. The foregoing description of the methods for determining the first preference information are only two exemplary descriptions. Specific methods to be used to determine the first preference information are not limited in the embodiments of the present disclosure.

The foregoing step 301 to step 304 are steps of acquiring first preference information corresponding to a plurality of users, the first preference information representing preference degrees of the users for a first object, the first object being an object on which the users have performed a transaction. In the embodiments of the present disclosure, a frequency factor (that is, a use frequency parameter), a weighting factor ( ), a balancing factor (that is, weights corresponding to parameters), an attenuation factor, and the like are introduced to determine the first preference information, that is, a preference degree of the user for a purchased object, to focus on the use of temporal information in user data, so that the determined first preference information fully integrates latest user preference features and is closer to current user preference.

305: The server determines similar users based on similarities between the first preference information corresponding to a plurality of users, and categorizes the similar users into one group.

In one embodiment, the server groups the users based on a locality sensitive hashing (LSH) algorithm. The process includes the following steps:

Step 1: The server respectively constructs preference vectors corresponding to the users based on the first preference information of the users for the first object.

One element in the preference vector is used for representing preference information of a user for one object. In one embodiment, each position in the preference vector corresponds to one object. In response to that an object is an object purchased by a user, that is, the first object, in the preference vector, the value of an element at a position corresponding to the object is the value of the first preference information of the user for the object. In response to that an object is an object that is not purchased by a user, that is, the second object, in the preference vector, the value of an element at a position corresponding to the object is 0. For example, a preference vector corresponding to one user is (5.1, 0, 2.3, 0, 0). The foregoing description of the method for determining a preference vector is only one exemplary description. A method to be used to determine preference vectors corresponding to the users is not limited in the embodiments of the present disclosure.

Step 2: The server groups the users based on the preference vectors corresponding to the users, and categorizing users with similar corresponding preference vectors into one group.

In one embodiment, the server respectively acquires hash values of the preference vectors corresponding to the users; and categorizes at least two users into one group in response to that the hash values of the preference vectors corresponding to the at least two users are the same.

The concept of user grouping is as follows: when preference vectors corresponding to two users are close, after hashing, it is highly likely that hash values of the preference vectors are the same, and when preference vectors corresponding to two users are not close, after hashing, it is hardly likely that hash values of the preference vectors are the same. Therefore, users can be grouped depending on whether hash values are the same.

In one embodiment, to avoid the gathering of excessive data in a group during grouping, that is, an excessively large quantity of users in a group, a quantity of users included in each group is restricted. For example, in response to that a quantity of users included in any group is greater than a quantity threshold, the server selects a first reference quantity of users from the any group, and removes unselected users from the any group. The first reference quantity is set by a developer. This is not limited in the embodiments of the present disclosure. The first reference quantity is less than or equal to a quantity threshold. In the embodiments of the present disclosure, a user quantity of users included in each group is restricted, so that a huge slice can be avoided, to prevent an amount of data in a single group from exceeding the kernel memory of the server, thereby ensuring that the server can perform data processing normally.

In the embodiments of the present disclosure, users are grouped by using an LSH algorithm. During subsequent operation, data analysis is respectively performed on each group of similar users, so that an operation amount of each data processing process can be effectively reduced, thereby improving the efficiency of data processing.

306: For any user, the server determines second preference information of the any user for a second object based on the first preference information corresponding to users belonging to the same group as the any user.

In one embodiment, for any user, the server predicts second preference information corresponding to the any user based on the first preference information corresponding to all users belonging to the same group as the any user. In the embodiments of the present disclosure, to reduce an amount of data processing in a process of determining the second preference information, the server screens users belonging to the same group as the any user again. That is, to determine the second preference information corresponding to the any user, at least one user with a relatively high similarity to the any user is first determined from a group, and then the second preference information of the any user for the second object is predicted based on a preference degree of the at least one user for the first object. For example, for any user in a group of users, the server acquires a second reference quantity of users with a similarity to the any user satisfying a reference condition from the group of users as reference users; and then determines the second preference information of the any user for the second object based on a preference vector corresponding to the reference users, for example, determines the second preference information by using a collaborative filtering algorithm. The reference condition and the second reference quantity are set by a developer. This is not limited in the embodiments of the present disclosure. The foregoing description of the method for determining the second preference information is only an exemplary description of one possible implementation. A specific method to be used to determine the second preference information is not limited in the embodiments of the present disclosure.

In one embodiment, the foregoing process of determining reference users is: for any user in a group of users, determining, by the server, distances between a preference vector corresponding to the any user and preference vectors corresponding to other users in the group of users; and then sorting the distances in ascending order, and determining users corresponding to the second reference quantity of distances at the top as reference users satisfying the reference condition. A distance between preference vectors corresponding to two users is a cosine distance between the vectors. The foregoing description of the method for determining reference users is only one exemplary description. A specific method to be used to determine reference users is not limited in the embodiments of the present disclosure.

In the embodiments of the present disclosure, to determine second preference information corresponding to a user, users in the same group are screened again, and only users that are most similar to the user are selected to participate in calculation, so that in one aspect, the accuracy of predicted second preference information can be improved, and in another aspect, an operation amount of a data prediction process can be effectively reduced.

The foregoing step 305 and step 306 are steps of determining second preference information corresponding to the plurality of users based on the similarities between the first preference information corresponding to the plurality of users, the second preference information representing preference degrees of the users for a second object, the second object being an object on which the users have not performed a transaction. In the embodiments of the present disclosure, users are first grouped based on similarities, and reference users are then selected from the group. It is not necessary to select reference users from all users, so that an amount of data processing in this stage is effectively reduced, and second preference information is predicted based on user data of a small number of reference users, so that the efficiency and accuracy of acquiring the second preference information can be improved.

307: The server constructs a first matrix based on the first preference information and the second preference information corresponding to the users.

One element in the first matrix represents preference information of one user for one object.

In one embodiment, the first matrix is constructed based on correspondence relationships between the preference information and users and objects. For example, a horizontal direction of the first matrix corresponds to an object sequence number, and a vertical direction corresponds to a user identifier. A first matrix of A*B represents a total of A users and B objects. A and B are both positive integers. One position in the first matrix can be determined based on one object sequence number and one user identifier. The value of the position is the value of preference information of the one user for the one object.

For example, when the second preference information corresponding to the plurality of users is set to a reference value, to implement relatively low dimensionalities of the first matrix, the plurality of users are grouped by using the preference vectors corresponding to the plurality of users. Users of a reference proportion are acquired from any group to form the first matrix. In this way, an amount of calculation can be relatively small. The value of the reference proportion is not limited in the embodiments of the present disclosure. For example, the reference proportion is 50% or the like.

308: The server performs iterative update on the first matrix to obtain a second matrix, and determines third preference information based on elements in the second matrix. That is, M rounds of iterative update are performed on the first matrix to obtain a second matrix of an Mth round, M being a positive integer greater than or equal to 1, and the third preference information is determined based on elements in the second matrix of the Mth round.

Figure 4:
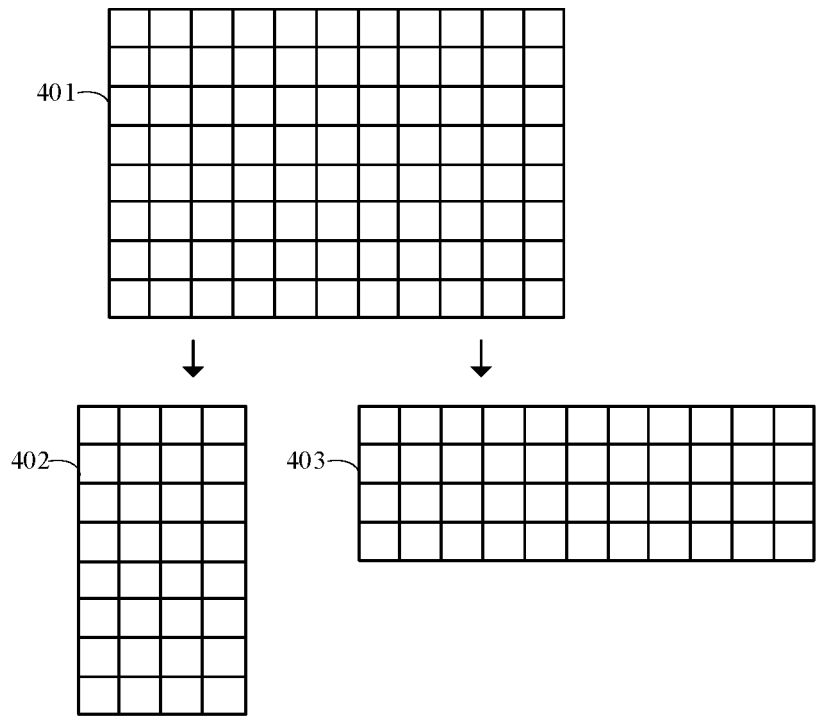
FIG. 4 is a schematic diagram of the decomposition of a first matrix according to an embodiment of the present disclosure.

In one embodiment, the server performs iterative update on the first matrix based on an alternating least squares (ALS) algorithm. A process of the first round of iterative update is used as an example for description. In one embodiment, the server first performs matrix decomposition on the first matrix to obtain a user submatrix and an object submatrix. The user submatrix is used for indicating preference features of the users for an object. The object submatrix is used for indicating correlation features between the objects and users. FIG. 4 is a schematic diagram of the decomposition of a first matrix according to an embodiment of the present disclosure. Referring to FIG. 4, for a first matrix 401 with dimensionalities of A*B, a horizontal direction is a user dimensionality, and a vertical direction is an object dimensionality. After matrix decomposition is performed on the first matrix to obtain a user submatrix 402 with dimensionalities of A*L and an object submatrix 403 with dimensionalities of B*L. A, B, and L are positive integers. A specific value of L is not limited in the embodiments of the present disclosure. A row of feature vectors in the user submatrix 402 are used for representing preference features of one user for an object. A column of vectors in the object submatrix are used for indicating correlation features between one object and users, that is, preference of the users for the one object. A specific method to be used to perform matrix decomposition is not limited in the embodiments of the present disclosure. The server solves the values of elements in the first matrix again based on the user submatrix and the object submatrix. For example, the process is represented by the following Formula (2):

$$\min_{x*,y*} L(X,Y) = \min_{x*,y*} \Sigma_{u,i \ is \ known} (r_{ui} - x_u^T y_i)^2 + \gamma (|x_u|^2 + |y_i|^2) \quad (2),$$

where u represents an object sequence number of an object, and i represents a user identifier of the user; $r_{ui}$ represents calculated preference information of the user u for the object I; $x_u$ represents the user submatrix, $y_i$ represents the object submatrix, and $L(X,Y)$ represents the target function; and γ represents an hyperparameter.

In the embodiments of the present disclosure, the server updates the values of the elements in the first matrix based on $r_{ui}$ to obtain a second matrix. In one embodiment, after acquiring the second matrix, the server needs to determine the accuracy of the values of the elements in the second matrix. For example, the server determines a second error (the second error is a mean-square error or the like between the second matrix and the first matrix) between the second matrix and the first matrix; in response to that the second error is less than a second error threshold, determines the second matrix with accurate data, and stops the process of iterative update; and in response to that the second error is greater than the second error threshold, determines the second matrix obtained through the current process of iterative update as a new first matrix, and updates the values of elements in the new first matrix to obtain a new second matrix. The server determines the third preference information based on a second matrix (that is, a second matrix obtained through the $M^{th}$ round) obtained through the last time of iterative update, that is, determines one element in the second matrix third preference information.

The foregoing description of the method for performing iterative update on the first matrix is only one exemplary description. A specific method to be used to update the first matrix is not limited in the embodiments of the present disclosure. In the embodiments of the present disclosure, preference features in a user dimensionality and correlation features in an object dimensionality are extracted based on global information, and iterative update is repeatedly performed on the determined preference information based on the features in the two dimensionalities, that is, the determined preference information is corrected based on the global information, thereby improving the accuracy of the acquired preference information.

309: The server generates training data based on any third preference information, a user attribute of a target user to which the any third preference information belongs, an object attribute of a target object to which the any third preference information belongs, and operation information of the target user for the target object.

The user attribute includes the gender, the age, a winning percentage of using the target object, and the like of the user. The object attribute includes the type, effect, and the like of the target object. Specific information included in the user attribute and the object attribute are not limited in the embodiments of the present disclosure. The operation information of the target user for the target object is used for representing whether the target user has performed a specific operation, such as whether the target user has purchased the target object, whether the target user has marked the target object as a favorite, whether the target user has added the target object to a specific list. Using the operation information representing whether the target user has purchased the target object as an example, if the target user has purchased the target object, the value of the operation information is 1. If the target user has not purchased the target object, the value of the operation information is 0. That is, the operation information is a binary scalar and is used as a label of training data. In the embodiments of the present disclosure, the constructed training data is represented in a vector-label (VL) form. The information such as the third preference information, the user attribute, and the object attribute is used for forming a feature part. The operation information is used for determining a label. In the embodiments of the present disclosure, the label is used to indicate whether one piece of training data is a positive sample or a negative sample.

In one embodiment, the server integrates/concatenates one piece of third preference information in the second matrix, a user attribute of a target user to which the third preference information belongs, an object attribute of a target object to which the third preference information belongs, and operation information of the target user for the target object to obtain initial training data. Certainly, the initial training data further includes data in other dimensionalities. This is not limited in the embodiments of the present disclosure.

In one embodiment, the server further needs to preprocess the initial training data to obtain training data. A process of the data preprocessing includes standardization, missing data complementation, consecutive feature discretization, data encoding, outlier removal, and the like. For example, in the stage of data encoding, the server encodes partial data in the initial training data by using one-hot encoding, and converts data such as gender in the initial training data into a binary character sequence. For example, the value is 0 when the gender is male. After one-hot encoding, the data is converted into a binary character sequence 001. The value is 1 when the gender is female. After one-hot encoding, the data is converted into a binary character sequence 010. The value is 2 when the gender is unknown. After one-hot encoding, the data is converted into a binary character sequence 100. In the stage of consecutive feature discretization, data is quantified again based on a discrete interval $[k_1, k_2, \ldots, k_n]$, where $k_n$ represents the value of the discrete interval, which monotonically increases as n increases. In the stage of standardization, value adjustment is performed on the initial training data by using a data normalization method. The data normalization method is represented by the following Formula (3):

$$x'_{ij} = \frac{x_{ij} - \mu_j}{\sigma_j}, \qquad (3)$$

where $x_{ij}$ represents the value of a $j^{th}$-dimension feature of the initial training data i, $\mu_j$ represents an average value of the $j^{th}$-dimension feature, $\sigma_j$ represents a standard deviation of the $j^{th}$-dimension feature, and $x'_{ij}$ represents a feature value of the $j^{th}$-dimension feature of the standardized initial training data i. The foregoing description of the process of data preprocessing is only an exemplary description. A specific method to be used to perform data preprocessing is not limited in the embodiments of the present disclosure. In the embodiments of the present disclosure, the server generates a plurality of pieces of training data based on the plurality of pieces of third preference information, to construct a training data set.

The foregoing description of the method for generating training data is only an exemplary description. The method for generating training data and specific information included in the training data are not limited in the embodiments of the present disclosure. For example, in a game application, when the object is a virtual item or a virtual character, the training data further includes an interactive message transmitted when a user uses a virtual item or a virtual character and movements of the user in a game and further includes information such as whether use frequency of a virtual item or virtual character by the user is normal.

310: The server performs iterative training on a target recommendation model based on the training data, and obtains a trained target recommendation model in response to that an output result of the target recommendation model satisfies a training condition.

Figure 5:
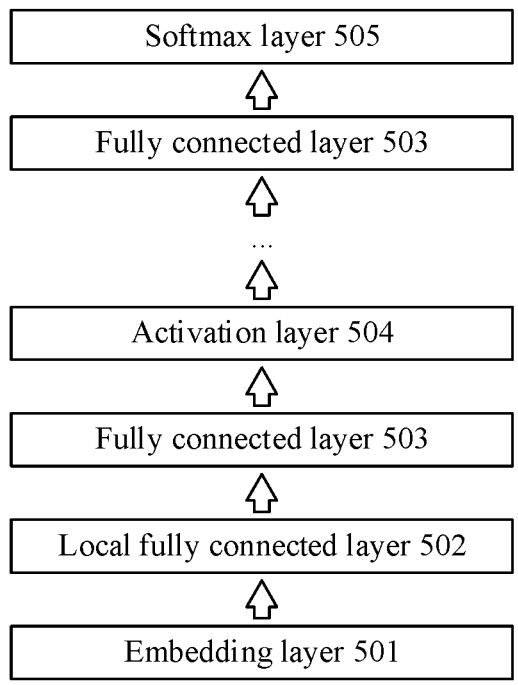
FIG. 5 is a schematic structural diagram of a target recommendation model according to an embodiment of the present disclosure.

The target recommendation model is a model constructed based on a deep neural network. In the embodiments of the present disclosure, an example in which the target recommendation model is a dichotomy model is used for description. FIG. 5 is a schematic structural diagram of a target recommendation model according to an embodiment of the present disclosure. Referring to FIG. 5, the target recommendation model includes an embedding layer 501, a local fully connected layer 502, a fully connected layer 503, an activation layer 504, and a softmax layer 505. In the embodiments of the present disclosure, three fully connected layer layers are included. Each fully connected layer is connected to one activation layer. The softmax layer 505 may also be considered as one activation layer. The embedding layer 501 is configured to convert inputted sparse data into a dense matrix. A quantity of input neurons included in the embedding layer 501 is consistent with a dimensionality of the training data set. The local fully connected layer 502 is configured to perform nonlinear mapping conversion on features of the same type and learn a nonlinear conversion relationship between features and labels. The fully connected layer 503 is configured to establish cross combinations between hidden layer features. The activation layer 504 is configured to improve the nonlinearity of a network structure of a model, thereby improving the complexity and robustness of the model. The softmax layer 505 is configured to normalize discrete probability distribution of finite elements, to output categories of samples and probabilities that the samples belong to the categories. The foregoing description of the structure of the target recommendation model is only an exemplary description. A specific structure of the target recommendation model is not limited in the embodiments of the present disclosure. For example, the target recommendation model is a tree model, a support vector machine model, or the like.

In one embodiment, the local fully connected layer and the fully connected layer are represented by the following Formula (4):

$$O_{ij} = \text{Leakly ReLU}(b_j + w_{ij} * x_{i-1,j}) \quad (4),$$

where i represents a neuron sequence number of each layer, j represents a network layer sequence number, $b_j$ represents an offset of a network layer j, $w_{ij}$ represents a weight value of the neuron i in the network layer j, $x_{i,j}$ represents the value of the neuron i in the network layer j, and $O_{ij}$ represents an output result.

An activation function applied in the activation function layer is represented by the following Formula (5):

$$\text{Leakly ReLU}(x_{i,j}) = \begin{cases} x_{i,j} & \text{if } x_{i,j} \geq 0 \\ x_{i,j}/\beta & \text{if } x_{i,j} < 0 \end{cases} \quad (5)$$

where i represents a neuron sequence number in each layer, j represents a network layer sequence number, and $x_{i,j}$ represents the value of the neuron i in the network layer j; and β is a hyperparameter, the value of β is set by a developer. In the embodiments of the present disclosure, β is set to 10.

A cross entropy function of the softmax layer is represented by the following Formula (6):

$$P(y = i \mid x) = \frac{e^{x^T w_i}}{\sum_{k=1}^{K} e^{x^T w_k}}, \quad (6)$$

where K represents a quantity of label categories, and in the embodiments of the present disclosure, the value of K is 2; and x represents an input vector of the softmax layer, $w_i$ represents a neuron weight of the softmax layer, and i represents a neuron sequence number in the softmax layer.

In one embodiment, the server extracts data from the training data set based on a first reference proportion, the data being used for training the target recommendation model, and extracts data from the training data set based on a second reference proportion as validation data to validate the training effect of the target recommendation model. The first reference proportion and the second reference proportion are set by a developer. This is not limited in the embodiments of the present disclosure. An example in which parameters of the target recommendation model are determined by using training data is used for description in the embodiments of the present disclosure. In one embodiment, the server inputs the training data into the target recommendation model to acquire an output result of the target recommendation model, and determines a first error between the output result and label information of the training data, for example, uses predicted third preference information in the training data as label information. The server backpropagates the first error to the target recommendation model in response to that the first error is greater than or equal to a first error threshold, solves parameters of operation layers in the target recommendation model again, and continues to read a next piece of training data and inputs the training data into the target recommendation model. The server directly reads a next piece of training data and inputs the training data into the target recommendation model in response to that the first error is less than the first error threshold. After repeated iterative training, the server determines that model training is completed in response to that the output result of the target recommendation model satisfies a training condition. The training condition is set by a developer. This is not limited in the embodiments of the present disclosure. For example, the training condition is set to that first errors between a target quantity of acquired output results and the training data are less than the first error threshold. The foregoing description of the method for training the target recommendation model is only an exemplary description. A specific method to be used to train the target recommendation model is not limited in the embodiments of the present disclosure.

In the technical solution provided in the embodiments of the present disclosure, second preference information of users for an unpurchased object is preliminarily predicted based on first preference information of the users for a purchased object, features in a user dimensionality and features in an object dimensionality are respectively extracted from the obtained first preference information and second preference information, then currently acquired preference information is corrected based on the features in the two dimensionalities to obtain more accurate third preference information, and training data is generated according to the third preference information, so that it is not necessary to directly perform data modeling according to original online data, the complexity and time consumption in a process of generating training data can be reduced, and a training period of a model is further reduced. In addition, the model can be updated in time according to latest user data, and an output result of the model can better meet current user preference.

Figure 6:
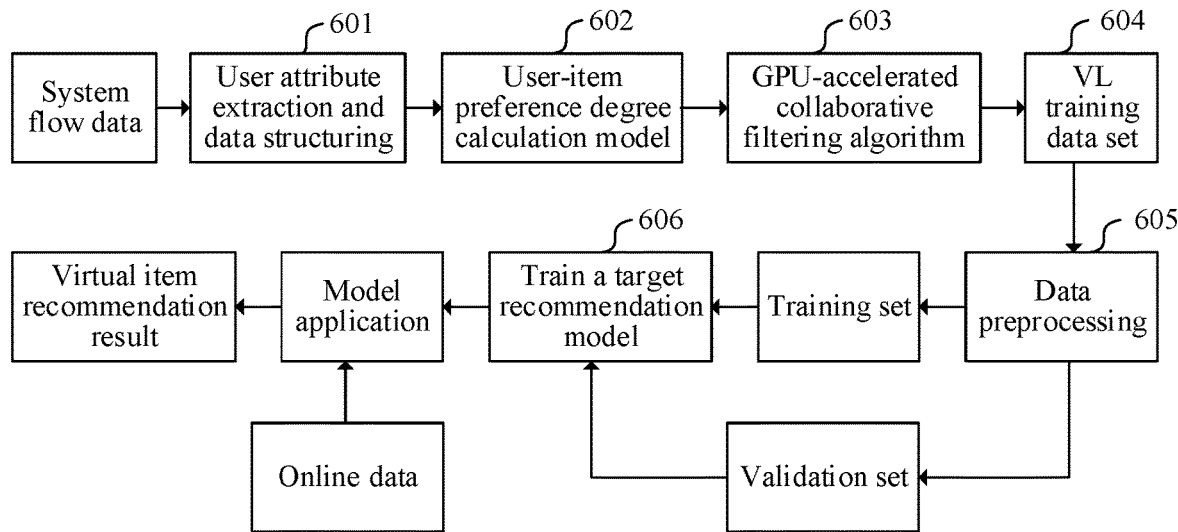
FIG. 6 is a schematic diagram of a process of generating training data and training a target recommendation model according to an embodiment of the present disclosure.
Figure 7:
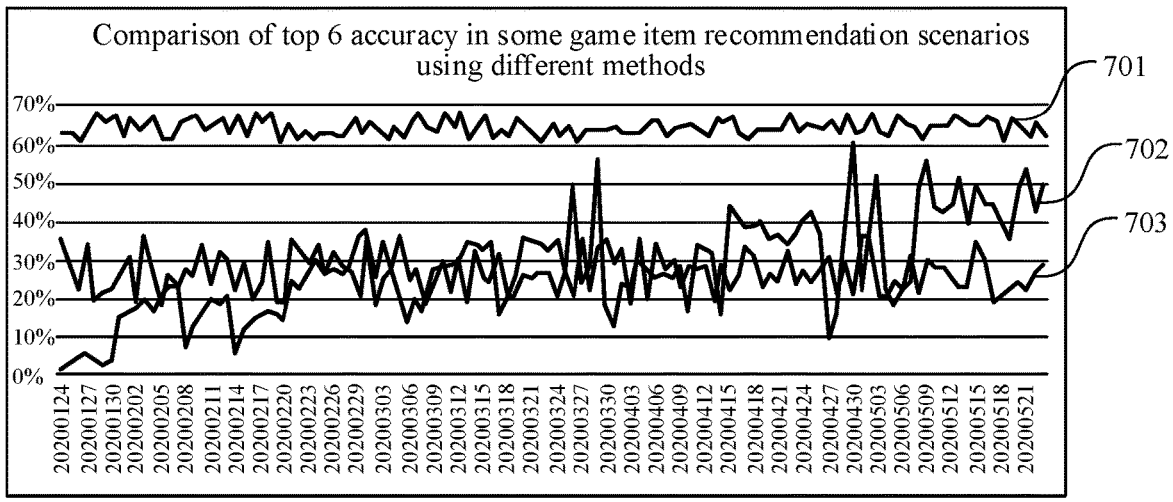
FIG. 7 is a schematic diagram of an accuracy status of a model according to an embodiment of the present disclosure.

FIG. 6 is a schematic diagram of a process of generating training data and training a target recommendation model according to an embodiment of the present disclosure. Referring to FIG. 6, an example in which the foregoing method for training a recommendation model is applied to a game application is used to describe the foregoing process. In one embodiment, to train a target recommendation model used for recommending a virtual item, the server first acquires system flow data from a cloud database, performs user attribute extraction and data structuring 601 based on the system flow data, and inputs extracted information into a user-item preference degree calculation model 602 to initially predict preference information of a user for virtual items, that is, performs a process of the foregoing steps 304 to 306; then performs data correction on initially predicted data by using a graphics processing unit (GPU)-accelerated collaborative filtering algorithm 603, that is, performs a process of the foregoing steps 307 and 308; and constructs a VL training data set 604 based on corrected preference information, and performs step 605 of data preprocessing on data in the training data set. In the embodiments of the present disclosure, the training data set is first divided into a training set and a validation set, and then step 606 of training a target recommendation model is performed to obtain a trained target recommendation model, so that the target recommendation model may be deployed online and a virtual item is recommended to a user based on online traffic. The embodiments of the present disclosure provide a multi-model integrated item recommendation method. An LSH algorithm-based user-item preference degree calculation model and an ALS algorithm model are introduced in a training data generation stage to predict preference information of a user for virtual items, to generate training data to train a target recommendation model. In this solution, multi-layer recall is implemented by using multi-model integration, to repeatedly correct predicted preference information, so that more accurate training data can be acquired. FIG. 7 is a schematic diagram of an accuracy status of a model according to an embodiment of the present disclosure. Referring to FIG. 7, the prediction of first 6 objects in which a user is interested is used as an example. A curve 701 represents a first accuracy of output results of the target recommendation model in the embodiments of the present disclosure, and is approximately stabilized at 65%. Curves 702 and 703 respectively represent a second accuracy and a third accuracy of output results of models obtained by using other training methods. As shown in FIG. 7, the values and stability of both the second accuracy and the third accuracy are less than the first accuracy. During the application of the technical solution provided in the embodiments of the present disclosure, temporal information is introduced in a training data generation stage, and rough adjustment to fine adjustment are performed on predicted preference information based on a multi-layer recall policy, to improve the accuracy of training data, thereby improving the accuracy of results of model training.

In the embodiments of the present disclosure, the foregoing process of generating training data is implemented through Spark (a computing engine). For example, preference information corresponding to a user is predicted based on user log flow data by using Spark. In one embodiment, data format is first converted before Spark reads data. For example, data such as a user sequence number (that is, a user identifier) is usually stored in a string format. Data stored in such a format consumes more memory. In the embodiments of the present disclosure, a storage type of the user sequence number is converted into a long integer type. For example, a data sequence number such as a user sequence number is converted through a hash transformation into a hash sequence number in a long format, and a mapping relationship between an original user sequence number and a hash sequence number is stored.

In one embodiment, in response to that read data, for example, data such as usage information of the first object by the plurality of users, includes an object of a non-random access type, the server performs type conversion on the object into an indexed sequence object. For example, in the foregoing process of grouping similar users, if an acquired object type is an Iterable type, random access to objects of such a type is not allowed, and the object type needs to be converted into an IndexedSeq type that supports random access. In the embodiments of the present disclosure, before data aggregation, type conversion is performed once on a non-random access object, and the object can be repeatedly accessed during subsequent application, so that object type conversion is not required in each access, to prevent a data skew to avoid a decrease in a data processing speed, thereby greatly improving system performance, and ensuring the efficiency of data processing. In addition, in the embodiments of the present disclosure, during data aggregation, a data amount restriction mechanism is introduced to control data to be gathered at a key value, that is, control a quantity of users to be categorized into one group, to reduce an operation amount of data processing once, thereby ensuring the efficiency of data processing.

In one embodiment, during grouping of similar users, that is, a data aggregation stage, to increase a data processing speed, each preference vector is divided into t bands. The size of each band is z. Preference vectors are compared in the dimensionality of band. t and z are positive integers. If a similarity between two user vectors is s, a probability that two users become similar users is presented as an S-shaped curve when t and z have different values. Based on the characteristics of the S-shaped curve, after the probability exceeds one threshold, the probability that the two users become similar users quickly increases and approaches 1. In the embodiments of the present disclosure, to maintain a relatively fast data processing speed and reduce grouping errors, the one threshold needs to be selected from a steepest area of the S-shaped curve. In the embodiments of the present disclosure, the preference vector is divided during data aggregation, thereby improving the efficiency of data processing, and the threshold is selected from a steepest area of the S-shaped curve, thereby improving the accuracy of data aggregation.

The method for training a target recommendation model by constructing training data is described in the foregoing embodiments. In the foregoing embodiments, the target recommendation model is combined with a plurality of application scenarios. In one embodiment, the application of the target recommendation model for object recommendation includes the following steps:

Step 1: In response to an object recommendation instruction, a server acquires, based on a user identifier carried in the object recommendation instruction, a user attribute indicated by the user identifier and log data including the user identifier.

In one embodiment, a terminal generates an object recommendation instruction in response to a login of a user or a view operation of an object recommendation interface, the object recommendation instruction including the user identifier of the user. The terminal transmits the object recommendation instruction to the server. The server acquires data indicated by the user identifier based on the user identifier. The data is, for example, a user attribute or log data (the log data is also referred to as user log flow data) of the user. Specific data to be acquired is not limited in the embodiments of the present disclosure. The foregoing description of the manner of triggering an object recommendation instruction is only an exemplary description. A specific method to be used to trigger an object recommendation instruction is not limited in the embodiments of the present disclosure.

Step 2: The server determines a user feature vector based on the user attribute and the log data.

In one embodiment, the server combines and preprocesses acquired data to obtain a user feature vector. The user feature vector is represented by the following Formula (7):

$$v=[x_1, x_2, x_3, \ldots, x_n] \quad (7),$$

$x_n$ represents user data in dimensionalities. A specific method for generating user feature vector is not limited in the embodiments of the present disclosure.

In another embodiment, the server acquires an object attribute of an object used or browsed by a user in log data, and concatenates the object attribute and a user attribute to obtain a user feature vector.

Step 3: The server inputs the user feature vector into the trained target recommendation model to acquire an object recommendation result outputted by the target recommendation model.

In one embodiment, step 3 is represented by the following Formula (8):

$$y = \text{sort}(f(v)) \tag{8}$$

where f( ) represents the target recommendation model, sort( ) represents sorting of output results of the target recommendation model, y represents an object recommendation result after sorting, and v represents the user feature vector.

Figure 8:
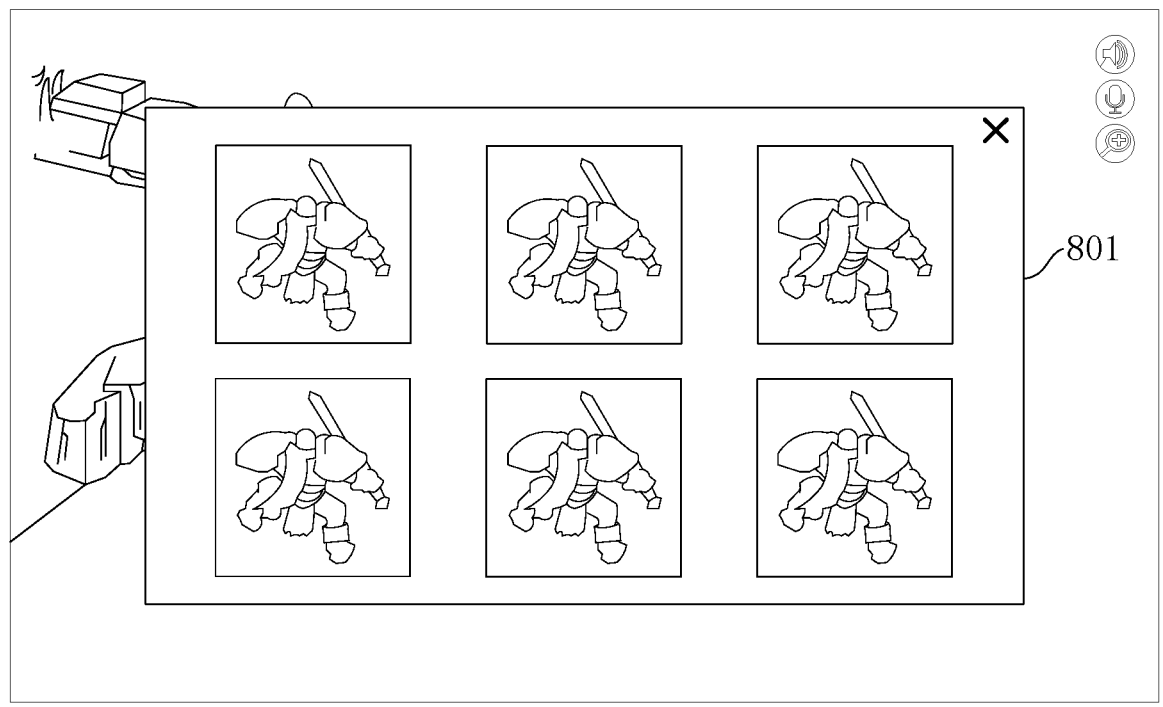
FIG. 8 is a schematic diagram of a display manner of recommended virtual items according to an embodiment of the present disclosure.

In one embodiment, the server transmits the object recommendation result to the terminal. The terminal displays a recommended object based on the object recommendation result. For example, the terminal displays an icon of the recommended object on an object recommendation interface or displays an icon of the recommended object in the form of a pop-up window. A specific manner of displaying the recommended object is not limited in the embodiments of the present disclosure. For example, the target recommendation model is applied to a game application. The target recommendation model recommends a virtual item based on a user feature. FIG. 8 is a schematic diagram of a display manner of recommended virtual items according to an embodiment of the present disclosure. An interface shown in FIG. 8 is used. The server pops up a pop-up window 801 in a starting interface of a game. Icons of recommended virtual items are displayed in the pop-up window 801.

Some embodiments of the present disclosure can be formed by using any combination of all the foregoing example technical solutions, and details are not described herein.

Figure 9:
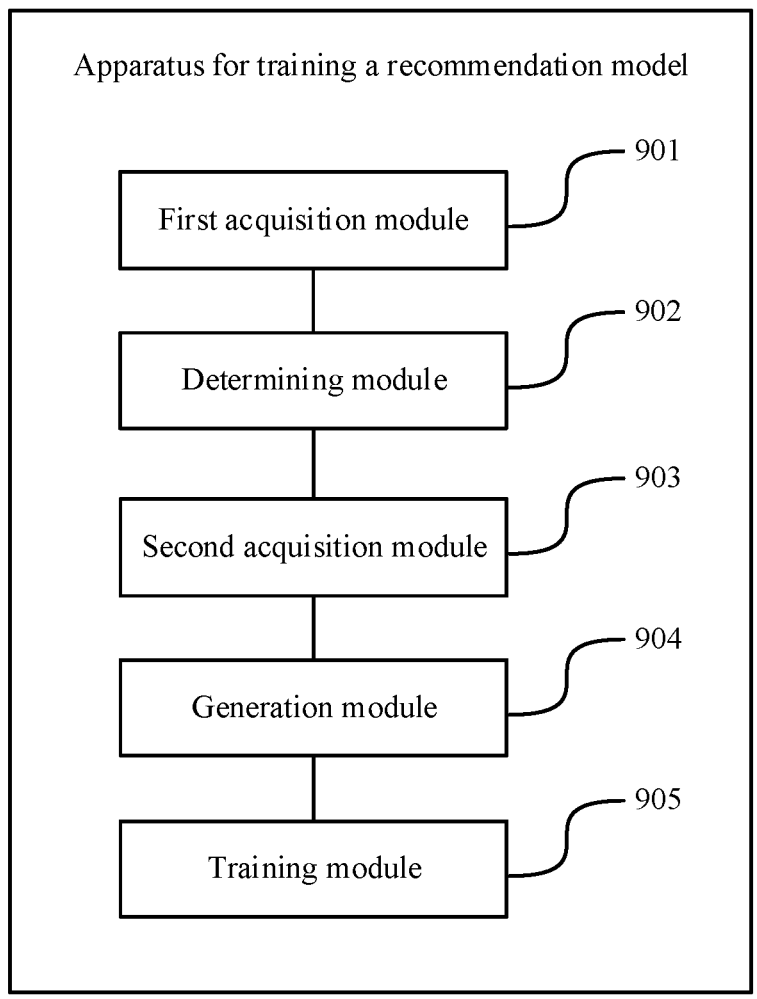
FIG. 9 is a schematic structural diagram of an apparatus for training a recommendation model according to an embodiment of the present disclosure.

FIG. 9 is a schematic structural diagram of an apparatus for training a recommendation model according to an embodiment of the present disclosure. Referring to FIG. 9, the apparatus includes:

a first acquisition module 901, configured to acquire first preference information corresponding to a plurality of users, the first preference information representing preference degrees of the users for a first object, the first object being an object on which the users have performed a transaction;

a determining module 902, configured to determine second preference information corresponding to the plurality of users, the second preference information representing preference degrees of the users for a second object, the second object being an object on which the users have not performed a transaction;

a second acquisition module 903, configured to correct the first preference information and the second preference information based on preference features of users for an object and correlation features between objects and the users, to obtain third preference information of the users for the objects, the preference features and the correlation features being determined based on preference degrees of the users for the objects;

a generation module 904, configured to generate training data based on any third preference information, a user attribute of a target user to which the any third preference information belongs, an object attribute of a target object to which the any third preference information belongs, and operation information of the target user for the target object; and a training module 905, configured to: perform iterative training on a target recommendation model based on the training data, and obtain a trained target recommendation model in response to that an output result of the target recommendation model satisfies a training condition.

In one embodiment, the first acquisition module 901 includes:

a parameter determining unit, configured to determine, for any user, a group of object use parameters corresponding to the any user based on usage information of one first object by the any user;

a weight acquisition unit, configured to acquire weights corresponding to parameters in the group of object use parameters; and an information acquisition unit, configured to perform a weighting operation on the parameters in the group of object use parameters to obtain the first preference information of the any user for the one first object.

In one embodiment, the usage information of the one first object by the any user includes a first moment at which the any user uses the one first object for the first time, a second moment at which the any user uses the one first object for the last time, a total quantity of times that the any user has used the one first object, and quantities of times that the any user has used the one first object within at least two reference time periods.

In one embodiment, the parameter determining unit is configured to:

determine a time interval parameter based on the second moment and a current moment;

determine a use frequency parameter based on the first moment, the current moment, and the total quantity of times;

determine a preference parameter based on the first moment, the second moment, the current moment, and the total quantity of times, the preference parameter being used for indicating a preference degree of the any user for the one first object at the current moment; and determine a balancing factor based on the quantities of times that the any user has used the one first object within the at least two reference time periods, the balancing factor being used for balancing preference degrees of the any user for the one first object within the at least two reference time periods.

In one embodiment, the weight acquisition unit is configured to:

respectively acquire a priori scores corresponding to the parameters; and determine the weights corresponding to the parameters based on the a priori scores and usage information of first objects by the users.

In one embodiment, the determining module 902 is configured to:

determine second preference information corresponding to the plurality of users based on similarities between the first preference information corresponding to the plurality of users.

In one embodiment, the determining module 902 includes:

a grouping unit, configured to determine similar users based on similarities between the first preference information corresponding to a plurality of users, and categorizes the similar users into one group; and an information determining unit, configured to determine, for any user, second preference information of the any user for a second object based on the first preference information corresponding to users belonging to the same group as the any user.

In one embodiment, the grouping unit includes:
a vector construction subunit, configured to respectively construct preference vectors corresponding to the users based on the first preference information of the users for the first object; and
a grouping subunit, configured to group the users based on the preference vectors corresponding to the users, and categorize users with similar corresponding preference vectors into one group.

In one embodiment, the grouping subunit is configured to:
respectively acquire hash values of the preference vectors corresponding to the users; and
categorize at least two users into one group in response to that the hash values of the preference vectors corresponding to the at least two users are the same.

In one embodiment, the apparatus further includes:
a screening module, configured to: in response to that a quantity of users included in any group is greater than a quantity threshold, select a first reference quantity of users from the any group, and remove unselected users from the any group.

In one embodiment, the information determining unit is configured to:
for any user in a group of users, acquire a second reference quantity of users with a similarity to the any user satisfying a reference condition from the group of users as reference users; and
determine the second preference information of the any user for the second object based on the first preference information corresponding to the reference users.

In one embodiment, the second acquisition module 903 is configured to:
construct a first matrix based on the first preference information and the second preference information corresponding to the users, one element in the first matrix representing preference information of one user for one object;
perform M rounds of iterative update on the first matrix to obtain a second matrix of an $M^{th}$ round, M being a positive integer greater than or equal to 1, in a process of each round of iterative update, acquire a second matrix obtained from a previous round of update as a new first matrix, perform matrix decomposition on the new first matrix to obtain the preference features of the users for the object and the correlation features between the objects and the users, and correct elements in the new first matrix based on the preference features and the correlation features to obtain a new second matrix; and
determine the third preference information based on elements in the second matrix of the $M^{th}$ round.

In one embodiment, the generation module 904 is configured to:
combine the third preference information, the user attribute of the target user to which the third preference information belongs, the object attribute of the target object to which the third preference information belongs, and the operation information of the target user for the target object, to obtain initial training data; and
preprocess the initial training data to obtain the training data.

In one embodiment, the apparatus further includes any one of the following:
a first conversion module, configured to: in response to that usage information of the first object by the plurality of users includes an object of a non-random access type, perform type conversion on the object of the non-random access type into an indexed sequence object; and
a second conversion module, configured to convert a storage type of a user identifier in the usage information into a long integer type.

In one embodiment, the apparatus further includes:
a receiving module, configured to receive an object recommendation instruction, the object recommendation instruction including a user identifier;
a third acquisition module, configured to acquire a user attribute indicated by the user identifier and log data including the user identifier based on the user identifier;
a vector determining module, configured to determine a user feature vector based on the user attribute indicated by the user identifier and the log data; and
a fourth acquisition module, configured to input the user feature vector into the trained target recommendation model to acquire an object recommendation result outputted by the target recommendation model.

The apparatus provided in the embodiments of the present disclosure preliminarily predicts second preference information of users for an unpurchased object based on first preference information of the users for a purchased object, respectively extracts features in a user dimensionality and features in an object dimensionality from the obtained first preference information and second preference information, then corrects currently acquired preference information based on the features in the two dimensionalities to obtain more accurate third preference information, and generates training data according to the third preference information, so that it is not necessary to directly perform data modeling according to original online data, the complexity and time consumption in a process of generating training data can be reduced, and a training period of a model is further reduced. In addition, the model can be updated in time according to latest user data, and an output result of the model can better meet current user preference.

When the apparatus for training a recommendation model provided in the foregoing embodiments trains a recommendation model, only division of the foregoing functional modules is used as an example for description. In the practical application, the functions can be allocated to and completed by different function modules according to requirements. That is, an internal structure of the device is divided into different functional modules, to complete all or some of the functions described above. In addition, the apparatus for training a recommendation model provided in the foregoing embodiment belongs to the same conception as the embodiment of the method for training a recommendation model. For a specific implementation process thereof, reference may be made to the method embodiment. Details are not described herein again.

The term module (and other similar terms such as sub-module, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 10:
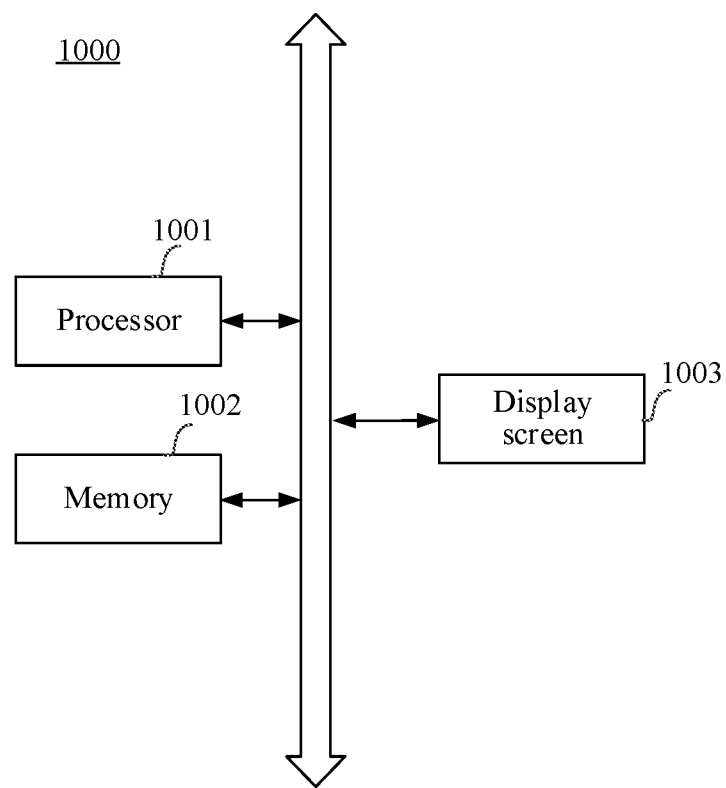
FIG. 10 is a schematic structural diagram of a terminal according to an embodiment of the present disclosure.

FIG. 10 is a schematic structural diagram of a terminal according to an embodiment of the present disclosure. The terminal 1000 is a smartphone, a tablet computer, a Moving Picture Experts Group Audio Layer III (MP3) player, a Moving Picture Experts Group Audio Layer IV (MP4) player, a notebook computer, or a desktop computer. The terminal 1000 may also be referred to as user equipment, a portable terminal, a laptop terminal, or a desktop terminal, among other names.

Generally, the terminal 1000 includes one or more processors 1001 and one or more memories 1002.

The processor 1001 includes one or more processing cores such as a 4-core processor or an 8-core processor. The processor 1001 is implemented by using at least one hardware form of digital signal processing (DSP), a field-programmable gate array (FPGA), and a programmable logic array (PLA). The processor 1001 also includes a main processor and a coprocessor. The main processor is a processor configured to process data in an awake state, and is also referred to as a central processing unit (CPU). The coprocessor is a low power consumption processor configured to process data in a standby state. In some embodiments, the processor 1001 is integrated with a GPU. The GPU is configured to render and draw content that needs to be displayed on a display screen. In some embodiments, the processor 1001 further includes an AI processor. The AI processor is configured to process computing operations related to machine learning.

The memory 1002 includes one or more computer-readable storage media. The computer-readable storage medium is non-transient. The memory 1002 may further include a high-speed random access memory and a non-volatile memory, such as one or more magnetic disk storage devices or a flash storage device. In some embodiments, a non-transitory computer-readable storage medium in the memory 1002 is configured to store at least one program code, the at least one program code being configured to be executed by the processor 1001 to implement the method for training a recommendation model provided in the method embodiments of the present disclosure.

In some embodiments, the terminal 1000 may include a display screen 1003. The display screen 1003 is configured to display a user interface (UI). The UI includes a graph, a text, an icon, a video, and any combination thereof. When the display screen 1003 is a touch display screen, the display screen 1003 is further capable of collecting a touch signal on or above a surface of the display screen 1003. The touch signal is inputted to the processor 1001 as a control signal for processing. In this case, the display screen 1003 is further configured to provide a virtual button and/or a virtual keyboard that are/is also referred to as a soft button and/or a soft keyboard. In some embodiments, there is one display screen 1003 disposed on a front panel of the terminal 1000. In some other embodiments, there are at least two display screens 1003 respectively disposed on different surfaces of the terminal 1000 or designed in a foldable shape. In some embodiments, the display screen 1003 is a flexible display screen, disposed on a curved surface or a folded surface of the terminal 1000. Even, the display screen 1003 is further set to have a non-rectangular irregular pattern, that is, a special-shaped screen. The display screen 1003 is prepared by using materials such as a liquid crystal display (LCD), an organic light-emitting diode (OLED), or the like.

A person skilled in the art can understand that a structure shown in FIG. 10 constitutes no limitation on the terminal 1000, and the terminal includes, for example, more or fewer components than those shown in the figure, or combine some components, or use a different component deployment.

Figure 11:
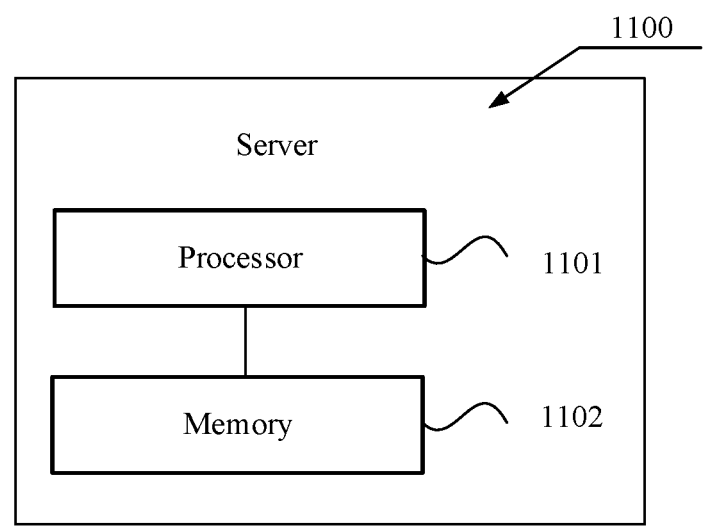
FIG. 11 is a schematic structural diagram of a server according to an embodiment of the present disclosure.

FIG. 11 is a schematic structural diagram of a server according to an embodiment of the present disclosure. The server 1100 may vary greatly due to different configurations or performance, and includes one or more processors (such as CPUs) 1101 and one or more memories 1102. The memory 1102 stores at least one program code, the at least one program code being loaded and executed by the processor 1101 to implement the methods provided in the foregoing method embodiments. Certainly, the device 1100 further has a wired or wireless network interface, a keyboard, an I/O interface and other components to facilitate I/O. The device 1100 further includes other components for implementing device functions. Details are not described herein again.

In some embodiments, a computer device is further provided, the computer device including one or more processors and one or more memories, the one or more memories storing at least one piece of program code, the at least one piece of program code, when being loaded and executed by the one or more processors, implementing the method provided in the foregoing method embodiments.

In an exemplary embodiment, a computer-readable storage medium, such as a memory including at least one piece of program code, is further provided, and the at least one piece of program code may be executed by a processor to complete the method for training a recommendation model in the foregoing embodiments. For example, the computer-readable storage medium is a read-only memory (ROM), a RAM, a compact disc ROM (CD-ROM), a magnetic tape, a floppy disk, an optical data storage device, or the like.

In an exemplary embodiment, a computer program product or a computer program is provided, the computer program product or the computer program including at least one piece of program code, the at least one piece of program code being stored in a computer-readable storage medium. A processor of a computer device reads the at least one piece of program code from the computer-readable storage medium, and the processor, when executing the computer program code, causes the computer device to implement the operations performed in the method for training a recommendation model.

A person of ordinary skill in the art can understand that all or some of the steps of the foregoing embodiments are implemented by hardware, or can be implemented by at least one piece of program code instructing relevant hardware by using a program. The program may be stored in a computer-readable storage medium. The storage medium is a read-only memory, a magnetic disk, an optical disc, or the like.

The foregoing descriptions are merely example embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for training a recommendation model, performed by a computer device on a server, the method comprising:

acquiring first preference information corresponding to a plurality of users, the first preference information representing preference degrees of the users for a first object, the first object being an object on which the users have performed a designated operation;

determining second preference information corresponding to the plurality of users based on similarities between the first preference information corresponding to the plurality of users, the second preference information representing preference degrees of the users for a second object, the second object being an object on which the users have not performed the designated operation, comprising:
- respectively constructing preference vectors corresponding to the users based on the first preference information of the users for the first object;
- respectively acquiring hash values of the preference vectors corresponding to the users;
- grouping the users based on the preference vectors corresponding to the users, and categorizing at least two users into one group in response to that the hash values of the preference vectors corresponding to the at least two users are the same, wherein a user quantity of users included in each group is restricted so as to prevent an amount of data in a single group from exceeding a kernel memory of the server; and
- determining, for one user, the second preference information of the user for the second object based on the first preference information corresponding to users belonging to the same group as the user;
- correcting the first preference information and the second preference information based on preference features of users for an object and correlation features between objects and the users, to obtain third preference information of the users for the objects, the preference features and the correlation features being determined based on preference degrees of the users for the objects;
- generating, by a computing engine, training data based on the third preference information, a user attribute of a target user to which the third preference information belongs, an object attribute of a target object to which the third preference information belongs, and operation information of the target user for the target object, wherein before generating the training data, a storage type of a string format data is converted into a number format, so as to reduce memory consumption; and
- performing iterative training on a target recommendation model based on the training data, and obtaining a trained target recommendation model in response to that an output result of the target recommendation model satisfies a training condition.

2. The method according to claim 1, wherein the acquiring first preference information corresponding to a plurality of users comprises:
- determining, for one user, a group of object use parameters corresponding to the user based on usage information of one first object by the user;
- acquiring weights corresponding to parameters in the group of object use parameters; and
- performing a weighting operation on the parameters in the group of object use parameters to obtain the first preference information of the user for the one first object.

3. The method according to claim 2, wherein the usage information of the one first object by the user comprises a first moment at which the user uses the one first object for the first time, a second moment at which the user uses the one first object for the last time, a total quantity of times that the user has used the one first object, and quantities of times that the user has used the one first object within at least two reference time periods.

4. The method according to claim 3, wherein the determining a group of object use parameters corresponding to the user based on usage information of one first object by the user comprises:
- determining a time interval parameter based on the second moment and a current moment;
- determining a use frequency parameter based on the first moment, the current moment, and the total quantity of times;
- determining a preference parameter based on the first moment, the second moment, the current moment, and the total quantity of times, the preference parameter indicating a preference degree of the user for the one first object at the current moment; and
- determining a balancing factor based on the quantities of times that the user has used the one first object within the at least two reference time periods, the balancing factor being used for balancing preference degrees of the user for the one first object within the at least two reference time periods.

5. The method according to claim 2, wherein the acquiring weights corresponding to parameters in the group of object use parameters comprises:
- respectively acquiring a priori scores corresponding to the parameters; and
- determining the weights corresponding to the parameters based on the a priori scores and usage information of first objects by the users.

6. The method according to claim 1, wherein after the determining similar users based on the similarities between the first preference information corresponding to the plurality of users, and categorizing the similar users into one group, the method further comprises:
- in response to that a quantity of users comprised in one group is greater than a quantity threshold, selecting a first reference quantity of users from the group, and removing unselected users from the group.

7. The method according to claim 1, wherein the determining, for one user, the second preference information of the user for the second object based on the first preference information corresponding to users belonging to the same group as the user comprises:
- for one user in a group of users, acquiring a second reference quantity of users with a similarity to the user satisfying a reference condition from the group of users as reference users; and
- determining the second preference information of the user for the second object based on the first preference information corresponding to the reference users.

8. The method according to claim 1, wherein the correcting the first preference information and the second preference information based on preference features of users for an object and correlation features between objects and the users, to obtain third preference information of the users for the objects comprises:
- constructing a first matrix based on the first preference information and the second preference information corresponding to the users, one element in the first matrix representing preference information of one user for one object;
- performing M rounds of iterative update on the first matrix to obtain a second matrix of an $M^{th}$ round, M being a positive integer greater than or equal to 1, in a process of each round of iterative update, acquiring a second matrix obtained from a previous round of update as a new first matrix, performing matrix decomposition on the new first matrix to obtain the preference features of the users for the object and the correlation features between the objects and the users, and correcting elements in the new first matrix based on the preference features and the correlation features to obtain a new second matrix; and determining the third preference information based on elements in the second matrix of the $M^{th}$ round.

9. The method according to claim 1, wherein the generating training data based on the third preference information, a user attribute of a target user to which the third preference information belongs, an object attribute of a target object to which the third preference information belongs, and operation information of the target user for the target object comprises:

combining the third preference information, the user attribute of the target user to which the third preference information belongs, the object attribute of the target object to which the third preference information belongs, and the operation information of the target user for the target object, to obtain initial training data; and preprocessing the initial training data to obtain the training data.

10. The method according to claim 1, wherein the method further comprises at least one of:

in response to that usage information of the first object by the plurality of users comprises an object of a non-random access type, performing type conversion on the object of the non-random access type into an indexed sequence object; or converting a storage type of a user identifier in the usage information into a long integer type.

11. The method according to claim 1, wherein after the performing iterative training on a target recommendation model based on the training data, and obtaining a trained target recommendation model in response to that an output result of the target recommendation model satisfies a training condition, the method further comprises:

receiving an object recommendation instruction, the object recommendation instruction comprising a user identifier;

acquiring a user attribute indicated by the user identifier and log data comprising the user identifier based on the user identifier;

determining a user feature vector based on the user attribute indicated by the user identifier and the log data; and inputting the user feature vector into the trained target recommendation model to acquire an object recommendation result outputted by the target recommendation model.

12. An apparatus for training a recommendation model, the apparatus comprising:

one or more processors and one or more memories, the one or more memories storing at least one piece of program code, the at least one piece of program code, when being loaded and executed by the one or more processors, implementing:

acquiring first preference information corresponding to a plurality of users, the first preference information representing preference degrees of the users for a first object, the first object being an object on which the users have performed a designated operation;

determining second preference information corresponding to the plurality of users based on similarities between the first preference information corresponding to the plurality of users, the second preference information representing preference degrees of the users for a second object, the second object being an object on which the users have not performed the designated operation, comprising:

respectively constructing preference vectors corresponding to the users based on the first preference information of the users for the first object;

respectively acquiring hash values of the preference vectors corresponding to the users;

grouping the users based on the preference vectors corresponding to the users, and categorizing at least two users into one group in response to that the hash values of the preference vectors corresponding to the at least two users are the same, wherein a user quantity of users included in each group is restricted so as to prevent an amount of data in a single group from exceeding a kernel memory of a server; and determining, for one user, the second preference information of the user for the second object based on the first preference information corresponding to users belonging to the same group as the user;

correcting the first preference information and the second preference information based on preference features of users for an object and correlation features between objects and the users, to obtain third preference information of the users for the objects, the preference features and the correlation features being determined based on preference degrees of the users for the objects;

generating, by a computing engine, training data based on the third preference information, a user attribute of a target user to which the third preference information belongs, an object attribute of a target object to which the third preference information belongs, and operation information of the target user for the target object, wherein before generating the training data, a storage type of a string format data is converted into a number format, so as to reduce memory consumption; and performing iterative training on a target recommendation model based on the training data, and obtaining a trained target recommendation model in response to that an output result of the target recommendation model satisfies a training condition.

13. The apparatus according to claim 12, wherein the acquiring first preference information corresponding to a plurality of users comprises:

determining, for one user, a group of object use parameters corresponding to the user based on usage information of one first object by the user;

acquiring weights corresponding to parameters in the group of object use parameters; and performing a weighting operation on the parameters in the group of object use parameters to obtain the first preference information of the user for the one first object.

14. The apparatus according to claim 13, wherein the usage information of the one first object by the user comprises a first moment at which the user uses the one first object for the first time, a second moment at which the user uses the one first object for the last time, a total quantity of times that the user has used the one first object, and quantities of times that the user has used the one first object within at least two reference time periods.

15. The apparatus according to claim 14, wherein the determining a group of object use parameters corresponding to the user based on usage information of one first object by the user comprises:

determining a time interval parameter based on the second moment and a current moment;

determining a use frequency parameter based on the first moment, the current moment, and the total quantity of times;

determining a preference parameter based on the first moment, the second moment, the current moment, and the total quantity of times, the preference parameter indicating a preference degree of the user for the one first object at the current moment; and determining a balancing factor based on the quantities of times that the user has used the one first object within the at least two reference time periods, the balancing factor being used for balancing preference degrees of the user for the one first object within the at least two reference time periods.

16. A non-transitory computer-readable storage medium, the computer-readable storage medium storing at least one piece of program code, the at least one piece of program code, when being loaded and executed by a processor, implementing:

acquiring first preference information corresponding to a plurality of users, the first preference information representing preference degrees of the users for a first object, the first object being an object on which the users have performed a designated operation;

determining second preference information corresponding to the plurality of users based on similarities between the first preference information corresponding to the plurality of users, the second preference information representing preference degrees of the users for a second object, the second object being an object on which the users have not performed the designated operation, comprising:

respectively constructing preference vectors corresponding to the users based on the first preference information of the users for the first object;

respectively acquiring hash values of the preference vectors corresponding to the users;

grouping the users based on the preference vectors corresponding to the users, and categorizing at least two users into one group in response to that the hash values of the preference vectors corresponding to the at least two users are the same, wherein a user quantity of users included in each group is restricted so as to prevent an amount of data in a single group from exceeding a kernel memory of the server; and determining, for one user, the second preference information of the user for the second object based on the first preference information corresponding to users belonging to the same group as the user;

correcting the first preference information and the second preference information based on preference features of users for an object and correlation features between objects and the users, to obtain third preference information of the users for the objects, the preference features and the correlation features being determined based on preference degrees of the users for the objects;

generating, by a computing engine, training data based on the third preference information, a user attribute of a target user to which the third preference information belongs, an object attribute of a target object to which the third preference information belongs, and operation information of the target user for the target object, wherein before generating the training data, a storage type of a string format data is converted into a number format, so as to reduce memory consumption; and performing iterative training on a target recommendation model based on the training data, and obtaining a trained target recommendation model in response to that an output result of the target recommendation model satisfies a training condition.

* * * * *